(12) United States Patent
Frauendorf et al.

(10) Patent No.: US 11,141,889 B2
(45) Date of Patent: Oct. 12, 2021

(54) METHOD FOR PRODUCING ELECTRICAL INSULATION PRODUCTS MADE OF SYNTHETIC POLYISOPRENE (IR) AND SIMILAR PRODUCTS

(71) Applicant: G-ZAG AG, Baar (CH)

(72) Inventors: Jose Luiz Frauendorf, Ouro Fino (BR); Felix Von Planta, São Paulo (BR)

(*) Notice: Subject to any disclaimer, the term of this patent is extended or adjusted under 35 U.S.C. 154(b) by 447 days.

(21) Appl. No.: 15/779,517

(22) PCT Filed: Dec. 9, 2016

(86) PCT No.: PCT/EP2016/080464
§ 371 (c)(1),
(2) Date: May 26, 2018

(87) PCT Pub. No.: WO2017/097991
PCT Pub. Date: Jun. 15, 2017

(65) Prior Publication Data
US 2018/0345542 A1 Dec. 6, 2018

(30) Foreign Application Priority Data
Dec. 10, 2015 (CH) .................................. CH01804/15

(51) Int. Cl.
*B29C 41/10* (2006.01)
*B29C 41/14* (2006.01)
(Continued)

(52) U.S. Cl.
CPC ............ *B29C 41/14* (2013.01); *A41D 13/008* (2013.01); *A41D 19/015* (2013.01); *A41D 31/26* (2019.02);
(Continued)

(58) Field of Classification Search
CPC ... B29C 41/14; B29C 41/003; B29C 71/0009; A41D 31/26; A41D 13/008; A41D 19/015; B29D 99/0064; B29D 99/0067
See application file for complete search history.

(56) References Cited

U.S. PATENT DOCUMENTS 4,921,672 A * 5/1990 Bock .................... B29C 45/2701
2/169
2006/0059604 A1 * 3/2006 Lai .......................... B29C 41/14
2/168

(Continued)

FOREIGN PATENT DOCUMENTS

| CN | 101838360 A | * | 9/2010 | |
| JP | 03161501 A | * | 7/1991 | ......... A41D 19/0058 |

(Continued)

OTHER PUBLICATIONS

International Search Report of PCT/EP2016/080464 (English translation from WIPO), dated Mar. 7, 2017.
(Continued)

*Primary Examiner* — Joseph S Del Sole
*Assistant Examiner* — Jamel M Nelson
(74) *Attorney, Agent, or Firm* — CUSPA Technology Law Associates, P.A.; Yi Li

(57) ABSTRACT

According to this procedure, these steps are made:
a) immersing a shaped mold (4) in a dipping process in a liquid synthetic polyisoprene (IR) (synthetic latex), wherein the shaped mold (4) has previously been treated with coagulation agent (coagulants) or thermally treated,
b) after the immersion, the synthetic polyisoprene layer is left on the shaped mold (4) and is freed from all salts with water,
c) thereafter, the synthetic polyisoprene layer together with the shaped mold (4) is vulcanized in an oven,
(Continued)

Figure 1:
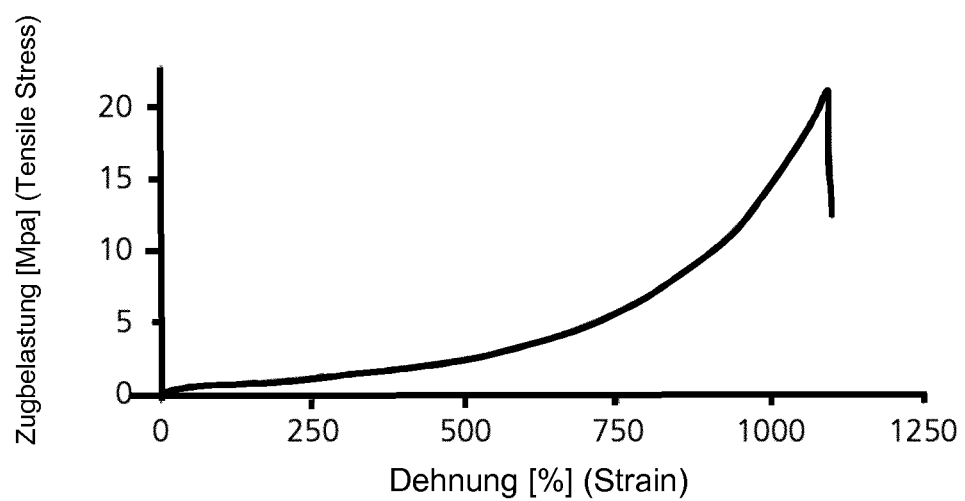

d) the synthetic polyisoprene layer is removed from the mold (4),
e) the salts precipitated by the vulcanization on the synthetic polyisoprene molded body (11) are washed off with water and a chlorine-containing solution,
f) the synthetic polyisoprene molded body (11) is halogenated to neutralize its pH and to increase its suppleness in contact with body skin with a halogenating solution,
g) the synthetic polyisoprene molded body (11) is dried. The electro-protective gloves thus produced are much more comfortable to wear, provide better insulation, even with thinner wall thickness, and they are more durable.

20 Claims, 4 Drawing Sheets

(51) Int. Cl.

| | | |
|---|---|---|
| *A41D 19/015* | (2006.01) | |
| *A41D 13/008* | (2006.01) | |
| *B29C 71/00* | (2006.01) | |
| *B29C 41/00* | (2006.01) | |
| *B29D 99/00* | (2010.01) | |
| *A41D 31/26* | (2019.01) | |
| *B29K 9/00* | (2006.01) | |
| *B29K 105/00* | (2006.01) | |
| *B29L 31/48* | (2006.01) | |
| *B29L 31/00* | (2006.01) | |
| *B29C 45/00* | (2006.01) | |

(52) U.S. Cl.
CPC ........ *B29C 41/003* (2013.01); *B29C 71/0009* (2013.01); *B29D 99/0064* (2013.01); *B29D 99/0067* (2013.01); *B29C 45/0001* (2013.01); *B29C 2071/0045* (2013.01); *B29K 2009/00* (2013.01); *B29K 2105/0064* (2013.01); *B29K 2995/0007* (2013.01); *B29L 2031/4864* (2013.01); *B29L 2031/768* (2013.01)

(56) References Cited

U.S. PATENT DOCUMENTS

2008/0306200 A1\* 12/2008 Chen ................ B29C 41/22
    524/418
2013/0191966 A1\* 8/2013 Rivkin ................ A41D 13/008
    2/243.1

FOREIGN PATENT DOCUMENTS

| JP | H03 161501 A | 7/1991 | |
|---|---|---|---|
| JP | 2009 057672 A | 3/2009 | |
| WO | 2007/017368 A1 | 2/2007 | |
| WO | WO-2007017368 A1 * | 2/2007 | ........... C08K 5/0025 |
| WO | 2015/175815 A1 | 11/2015 | |

OTHER PUBLICATIONS

Written Opinion of the International Search Authority of PCT/EP2016/080464 (English translation from WIPO), dated Mar. 7, 2017.

\* cited by examiner

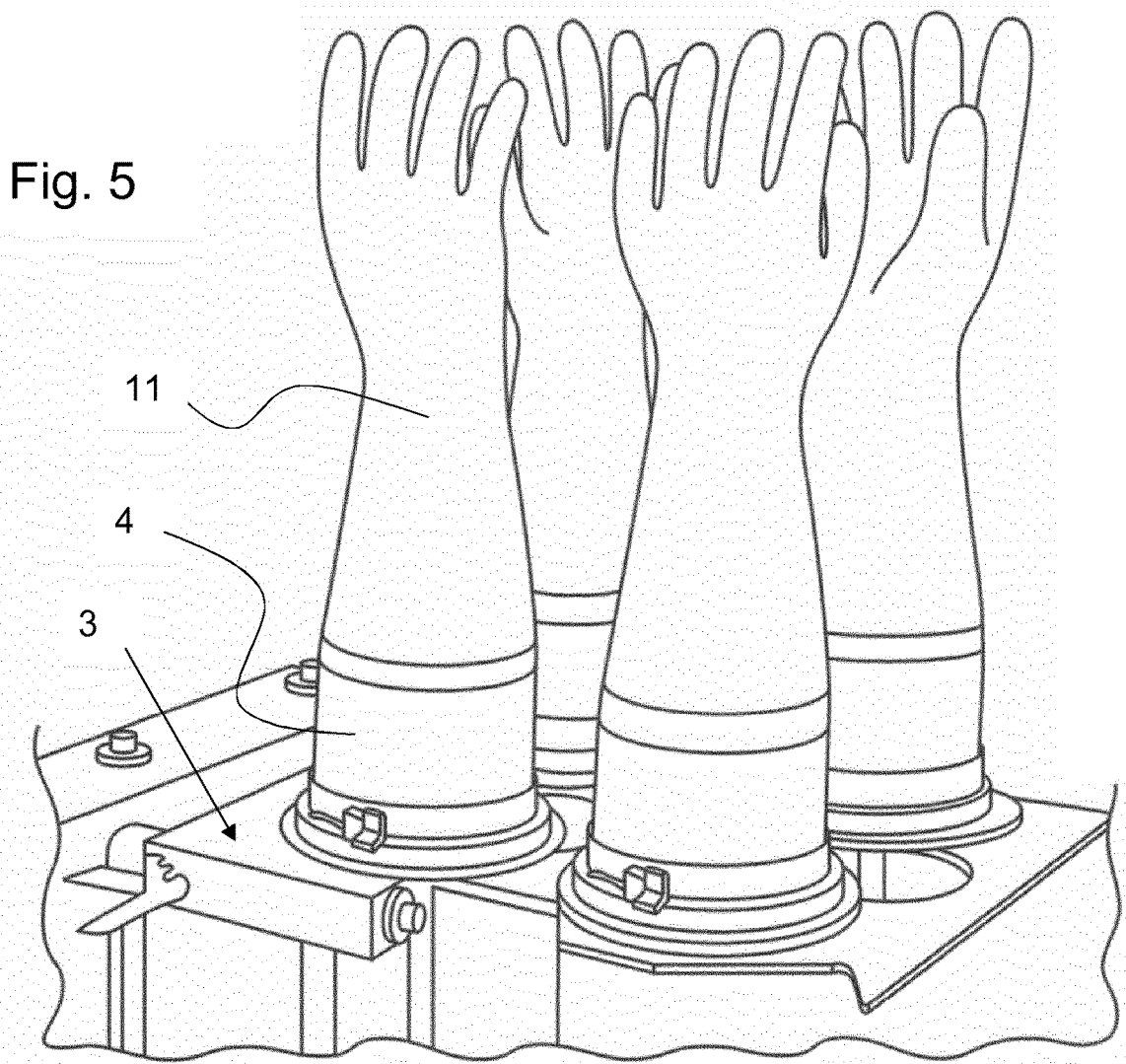

METHOD FOR PRODUCING ELECTRICAL INSULATION PRODUCTS MADE OF SYNTHETIC POLYISOPRENE (IR) AND SIMILAR PRODUCTS

This invention relates, on the one hand, to a method of producing various products for the isolation of electrical voltage and, on the other hand, to produce such products in general, in particular for example protective gloves for electricians, fitters and other professionals in the high voltage field and made of artificial polyisoprene.

Conventionally, protective gloves for work around power lines and high voltage systems are being produced and made of natural rubber (rubber) or natural latex. These rubber gloves are relatively thick-walled, somewhat rigid and offer little wearing comfort, but provide adequate protection against electric shocks as required by international standards. They must be replaced from time to time to meet safety standards and regulations. For the manufacture of rubber or rubber, inevitably and procedurally, highly toxic and environmentally harmful solvents (toluene) are being used, and the gloves are produced in a tedious, energy-intensive process under the influence of high temperatures and pressure. Although natural latex products do not use toxic solvents, the process is slow and product properties are inferior. The inconsistency of the natural raw material and the production process ensure a relatively high reject rate. Both natural rubber and latex products are not free of proteins and contain other residues, such as e.g. ammonium, which stem from the manufacturing process or are contained in the raw material and which can lead to allergies.

Natural latex products, though, may be produced at lower cost than natural rubber (NR) based insulation gloves. However, these (NR) electro-protective gloves have a limited ability to insulate in a moisturous environment, especially on gloves of higher insulation classes, the electrical as well as mechanical and physical properties may be limiting.

The object of the present invention is to provide a method for the production of electrical insulation products which overcomes the disadvantages mentioned above and supplies products that meet or exceed the safety-relevant requirements and at the same time offer a much improved comfort and a longer life. In particular, these products should be free from harmful substances and substances which can trigger allergies in the wearer. They should be at least free of ammonium and proteins and their production should be much more ecological.

This object is achieved by the present methods for the production of electrical insulation products for Personal Protection Equipment (PPE), in which synthetic polyisoprene (IR) or synthetic latex is used to produce a molded body in that a synthetic polyisophrene emulsion is used to form a layer by coagulation on a mold, or a fluid synthetic polyisoprene is injected into a hollow mold, and then the resulting molded body is vulcanized and demolded, made salt-free, pH-neutral and supple with respect to the body skin by washing, leaching and halogenation.

The products, i.e. the electrical insulation products thus produced, are characterized by the fact that they consist essentially of synthetic polyisoprene (IR). Various specific electrical insulation products for personal protection equipment (Personal Protection Equipment PPE) are disclosed.

The manufacturing method is disclosed with reference to the drawings. The individual steps are described and the products made therewith, namely the insulation protection gloves and others, are described and their peculiarities and are explained.

Figure 2:
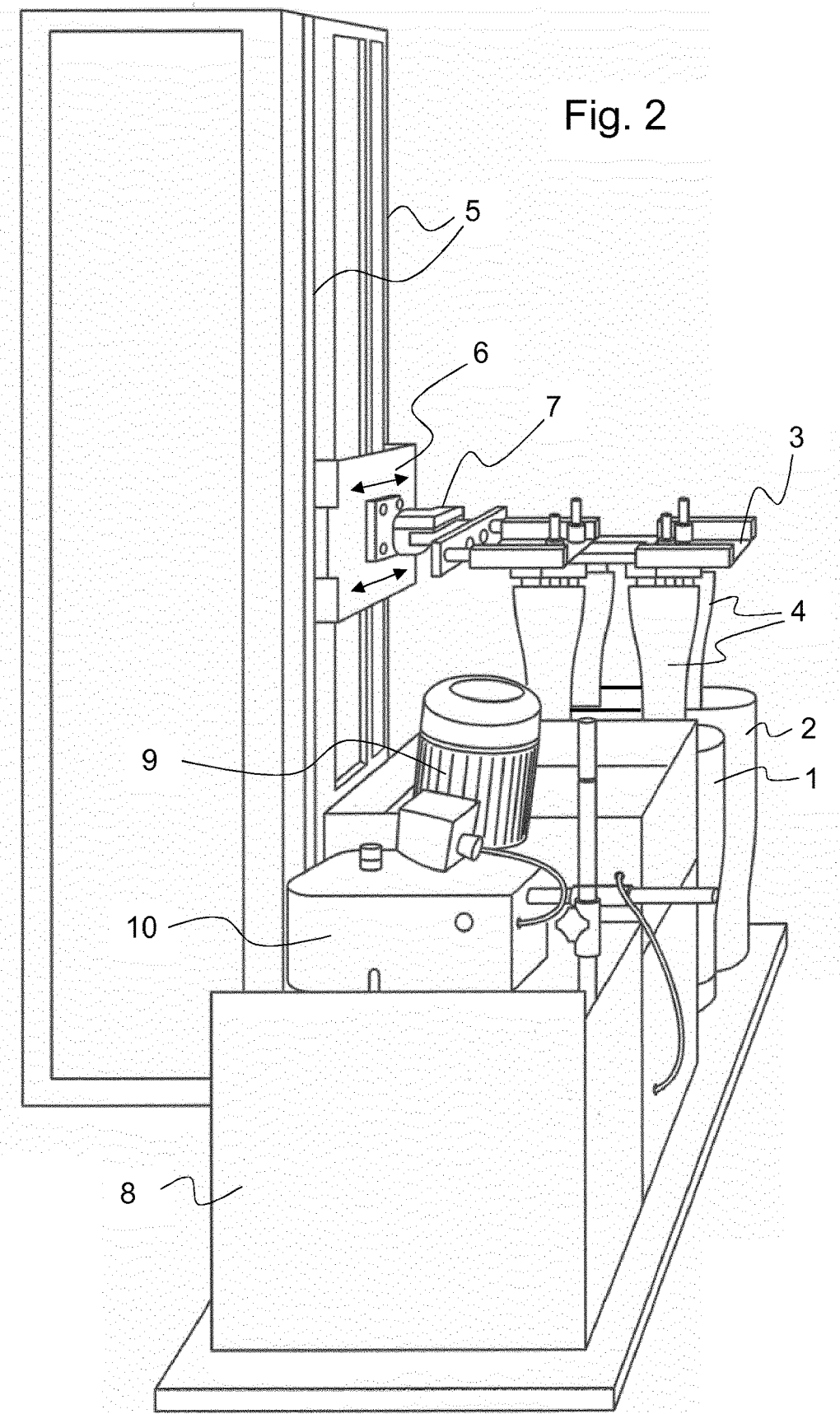
Figure 3:
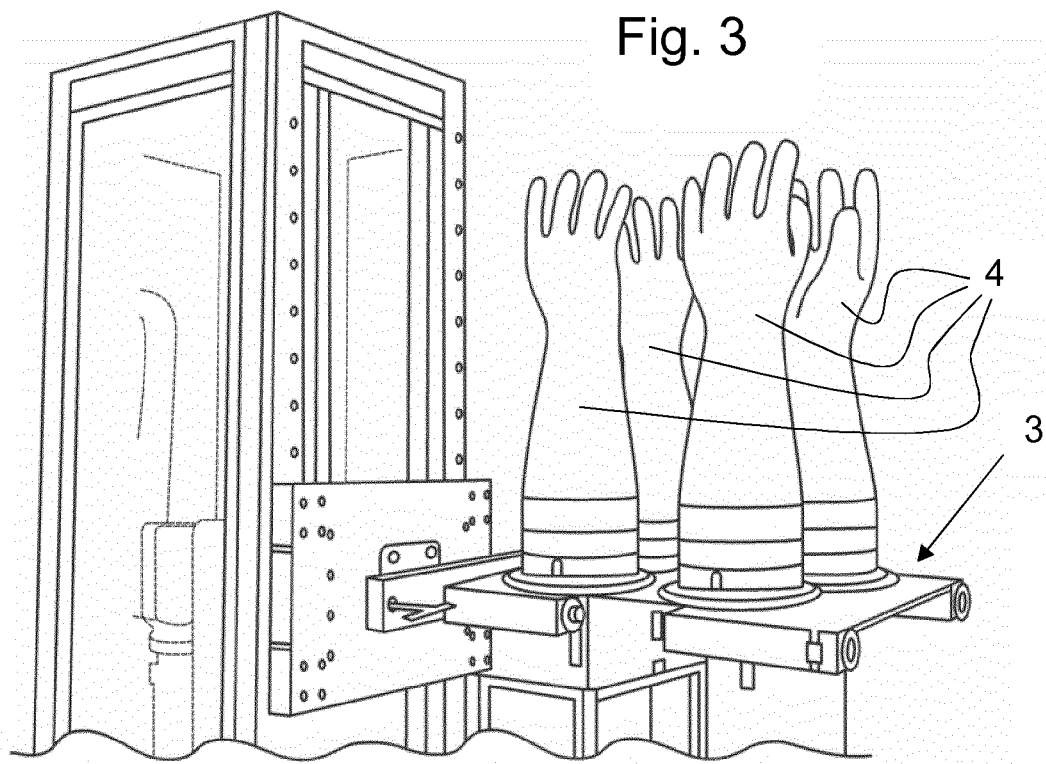
Figure 4:
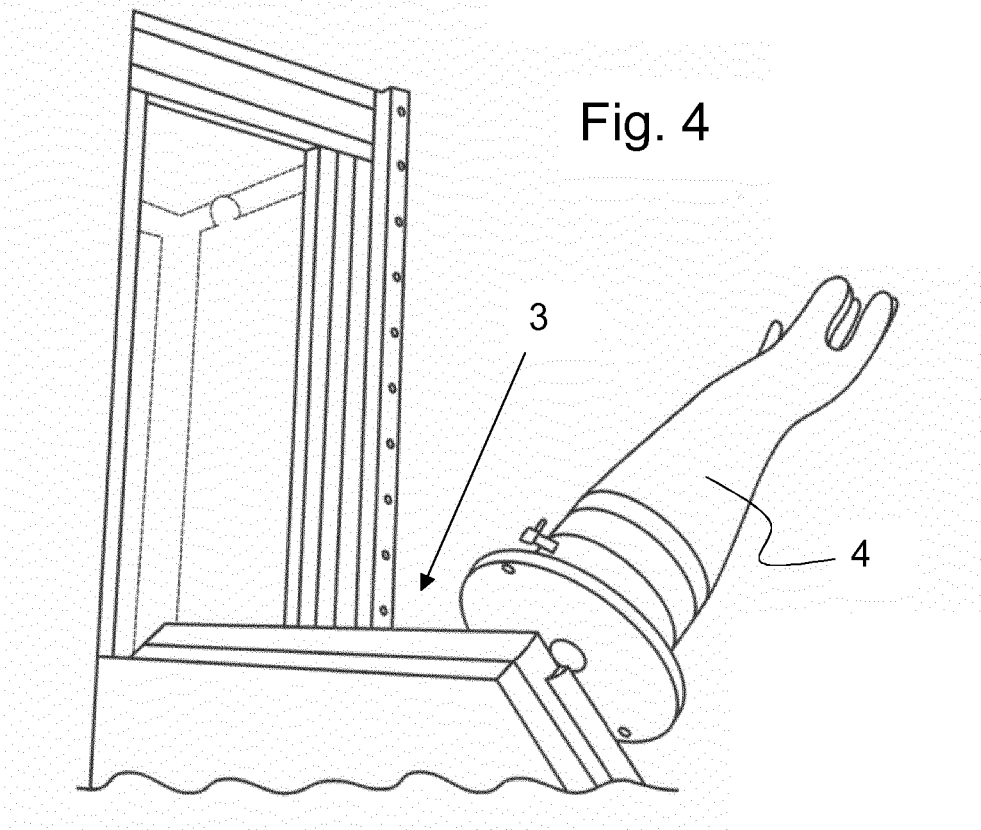

It shows:
FIG. 1: The elongation characteristic of synthetic polyisoprene (IR);
FIG. 2: A device with height-adjustable swivel table for immersing molds;
FIG. 3: A swivel table with four glove molds, ready for immersion in a polyisoprene dip;
FIG. 4: The swivel table in 45° tilted position with a single glove-shaped body, with resulting thereon synthetic polyisoprene layer, after dipping from the polyisoprene immersion bath;
FIG. 5: The swivel table with four protective gloves on their molds, after vulcanization of the synthetic poly-isoprene.

The invention is based on the new knowledge that synthetic latex (IR) has particularly good electrical insulation properties, and this gave rise to the development of electro-isolation products of synthetic polyisoprene (IR). However, the development process to a viable product was paved with numerous obstacles and it proved to be a great challenge to meet all requirements. In search of better production methods, synthetic latex was chosen from anionically polymerized isoprene, the so-called synthetic polyisoprene latex (IR), available in emulsion form, for example from US Company Kraton, 15710 John F. Kennedy Blvd., Suite 300, Houston, Tex. 77032 USA. As important quality features, the following are stated by the manufacturer of the polyisoprene:

The nature of synthetic latex (IR) is very similar to natural latex and shows similar properties.

Synthetic polyisoprene (IR) is free of impurities that are inevitable in natural latex or rubber.

Synthetic latex (IR) can be produced in constant quality and purity with consistent molecular structure.

Synthetic latex (IR) contains no ammonium and therefore does not develop an ammonia smell like rubber.

Synthetic latex (IR), as a petroleum-based product, does not contain any proteins.

The stereoregular structure of the synthetic latex (IR) improves its mechanical and physical properties, which are important for the electrical insulation values. The molecular structure is linear and not crosslinked as in natural rubber or latex (NR), which guarantees a more compact molecular structure after vulcanization.

The molecular structure determines a lower modulus of elasticity, which provides greater comfort even at lower temperatures.

Here are some values of synthetic latex (IR) versus natural latex (NR) listed:

|  | Synthetic polyisopren (IR) | Natural latex/rubber (NR) |
| --- | --- | --- |
| Proportion of solids (% by weight) | 65 | Similar |
| Proportion of gum (wt %) | 64 | Lower |
| pH-value | 11 | Similar |
| Ammoinum (% by weight) | 0 | 0.2-0.8 |
| Ø particle size (µm) |  |  |
| Mechanical stability (sec) | >1500 | >900 |
| Viscosity similar to Brookfields (mPa · s) | 50-150 | Similar |

So far, artificial latex (IR) is being used for the coating of road and floor coverings, in the adhesives industry, in the paint industry, as packaging, for medical products and for personal care products. For example, the use is known for the production of surgical gloves, condoms and pacifiers.

As a first suitable electrical insulation product, electro-protective gloves are presented here as these are prescribed for various work by electricians, and their manufacturing process will be described. Conventional protective gloves are made of natural latex or natural rubber according to the following procedure:

A purified glove inner mold is immersed in a coagulum solution, emerged again and then dried. Then the mold is immersed in a latex rubber liquid which has been mixed with various chemicals. This process of immersing and emerging again is repeated until the appropriate rubber thickness is achieved according to the desired standard. After the last emerging, a pre-hardening takes place, then a leaching and afterwards the vulcanization. As salts are separated, a post-leaching follows, after which the product can be removed from the mold.

For the production of such electro-protective gloves made of synthetic polyisoprene or synthetic latex (IR), however, this production process must be modified and adapted in a special manner. Briefly, a layer of synthetic polyisoprene (IR) or synthetic latex is formed on a mold by coagulation, de-salted, and then vulcanized, and then the formed molded body made salt-free by washing and leaching, and the surface is being treated by a halogenation, made pH-neutral and thus made skin-friendly, and the product becomes supple in terms of contact with body skin. More specifically, the procedure for manufacturing Personal Protective Equipment (PPE) electrical insulation products involves these steps:

a) a mold, pretreated with a salt solution and/or heat at a certain temperature is immersed in a dipping process into an emulsion of synthetic polyisoprene (IR) or synthetic latex, with additives in this IR emulsion to affect the coagulation and improve the subsequent vulcanization. After emmersion and during the gel formation, water and salts are being released on the surface which process is called sweating.

b) The molded article with the polyisoprene layer is being washed in a water bath for a certain time and leached to free the product from salts.

c) Then, the polyisoprene layer is vulcanized together with the mold in an oven.

d) The polyisoprene layer is removed from the mold.

e) In an after-treatment of the molded article drawn off from the mold, the salts precipitated by the vulcanization are being washed out on the polyisoprene molded article with water.

f) The polyisoprene molded body is then treated in a further surface treatment in a halogenating solution so the surface is becoming pH-neutral and thus friendly to the skin and forms a pleasant smooth surface for the wearer;

g) Finally, the polyisoprene molded article is dried.

With a product manufactured in such way, the applicable standards for quality requirements can be met and even exceeded. Certification efforts are directed, for example, to insulation gloves according to American and European standards: ASTM D 120 (USA), IEC 60903 (Europe) and also according to the Brazilian standards (ABNT NBR 10622/10624 and ABNT-BR 16295).

As an example, the required properties are given below in a table according to the common grouping of electro-protective gloves. The products are classified according to these standards in classes and sizes.

| Product color | Class | Voltage for use - in volts | Test voltage in volts |
|---|---|---|---|
| beige | 00 | 500 V | 2'500 V |
| red | 0 | 1'000 V | 5'000 V |
| white | 1 | 7'500 V | 10'000 V |
| yellow | 2 | 17'000 V | 20'000 V |
| green | 3 | 26'500 V | 30'000 V |
| orange | 4 | 36'000 V | 40'000 V |

| | |
|---|---|
| Size of the protective gloves | 8/8.5/9/9.5/10/10.5/11/11.5/12 |
| Length of the protective gloves | 280/360/410/460 mm |

The test values pertaining to the various product classes in particular can be taken from the following table:

| | | | | |
|---|---|---|---|---|
| | | | | Standard (Brazil current) |
| | | US-EU-BR | US-EU-BR | NBR10622/1989 |
| Length in | US-EU-BR | Standards | Standards | Minimal voltage |
| total | Standards | ASTM/NBR/IEC | ASTM/NBR/IEC | in V (AC) until |
| 360 mm | ASTM/NBR/I | Voltage for use | Test voltage V | reaching electric |
| Classification | Length | V (AC) | (AC) | breakdown |

| Standards for electro-isolation gloves | | | | |
|---|---|---|---|---|
| 00 | 280/360 mm | 500 | 2'500 | 5'000 |
| 0 | 280/360/410/460 mm | 1'000 | 5'000 | 6'000 |
| 1 | 360/410/460 mm | 7'500 | 10'000 | 20'000 |
| 2 | 360/410/460 mm | 17'000 | 20'000 | 30'000 |
| 3 | 360/410/460 mm | 26'500 | 30'000 | 40'000 |
| 4 | 410/460 mm | 36'000 | 40'000 | 50'000 |

| | | Standards for electro-isolation gloves | |
|---|---|---|---|
| Length total 360 mm Classification | US-EU-BR Standards ASTM/NBR/I Length | Standard (Brazil new) IEC60903/2002 NBR16295/2014 Minimum of reachable voltage V (AC) until electrical breakdown | US-EU-BR standards ASTM/NBR/IEC Measurable creeping current maxima mA (AC) |
| 00 | 280/360 mm | 5'000 | 8/12 |
| 0 | 280/360/410/460 mm | 10'000 | 8/12/14/16 |
| 1 | 360/410/460 mm | 20'000 | 14/16/18 |
| 2 | 360/410/460 mm | 30'000 | 16/18/20 |
| 3 | 360/410/460 mm | 40'000 | 18/20/22 |
| 4 | 360/410/460 mm | 50'000 | 22/24 |

Water conductivity </= 100 uS/cm
Increasing of voltage for the test = 1 kV/s
Voltage applied for 1. test: 3 minutes, and for repetitions: 1 minute.

Due to the degree of purity and the specific molecular structures of the raw material, namely the synthetic polyisoprene or the synthetic latex (IR), the electrical insulation capabilities as well as the mechanical and physical properties of the rubber of IR are significantly better than those of conventional gloves of natural rubber or natural latex, which has been proven by extensive testing. The synthetic polyisoprene has a high, uniform molecular weight, has a high raw material purity, a good flow consistency and is free of ammonium and proteins, such as those found in natural rubber or latex gloves which often cause allergic reactions when such natural latex rubber gloves are being worn (according to WHO 10% of the world population).

An anionic polymerization of the isoprene results in a high proportion of CIS-1,4 connections in the synthetic latex. This allows long linear connections, according to the following structure:

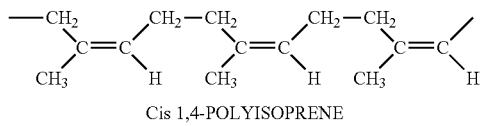

Cis 1,4-POLYISOPRENE

The most important properties of the synthetic polyisoprene raw material of interest here are the following:
It has better insulation per mm thickness than natural latex/rubber.
Products made of synthetic polyisoprene are characterized by a better tear strength and elasticity than natural latex / rubber.
Synthetic polyisoprene (IR) products are more comfortable to wear and do not trigger protein allergies.

As the flat curve in FIG. 1 indicates, the measured values, on the occasion of a tensile test, show that synthetic polyisoprene or latex is particularly soft and 'soft elastic', demonstrated by the curve of the tensile load in the test, which rises slightly above 700% elongation.

The emerging method for the production of electro-isolation gloves is based on the coagulation of the synthetic polyisoprene (IR) on the surface of forearm molds made of porcelain, metal or other materials, whereby a porcelain mold with a rough, sandpaper-like surface turned out to be particularly advantageous. The coagulation is induced by coagulants agents into which the molds are immersed before being finally immersed in the synthetic polyisoprene IR emulsion.

FIGS. 2 shows a device for the serial production of such electro-insulation gloves. It includes a dip bath 1 for coagulants, next to a dip bath 2 for the liquid, synthetic polyisoprene IR and a height-adjustable swivel table 3, on which the molds 4 are mounted, in the example shown for four protective gloves to be produced. The swivel table 3 is mounted vertically adjustable on vertically extending rails 5. An electrical linear unit 6 allows to move the swivel table 3 PLC-controlled on the rails 5 up and down, and also to move back and forth in the horizontal as shown with arrows. Outside of this linear unit 6, a pivoting mechanism 7 is installed with its own electric motor, so that the pivoting table 3 is motor-driven around 180°. The mold 4 on the swivel table 3 can therefore be immersed in the position shown here in the baths 1, 2 and pulled out again and thereafter immediately pivoted by 180°. This ensures that the coagulated layer, which is still soft on its outer side and has a downward tendency due to gravity, is directed in the opposite direction by rotating the moldings by 180° back, whereby until then, the tendency to flow will be stopped due to drying and advancing coagulation. In the foreground of the picture, a mixing unit 10 with electric motor 9 to drive the mixer can be seen. In the container 8, the synthetic polyisoprene IR can be processed. Optionally, this is mixed with a specific coagulant, so that the wetting of the mold 4 with a coagulant can be omitted. In this case, however, the mold 4 must be heated in order to achieve a safe and rapid coagulation. The ideal temperature of the mold 4 is approximately 60° C. to 70° C. for this purpose.

In the following, the production process will be explained in further detail. The preparation of the right solutions depends on:
the composition of the mixtures
the sequence of adding the individual elements
the mixing process, the timing and the type, as well as the frequency of mixing
the thermo-conditioning of the solutions
the maturing process
and can be easily determined and optimized by the skilled person.

The function of the coagulant (coagulant) is it to destabilize the IR particles and to cause them to coagulate. For the success and uniformity of the layer on the porcelain form, the purity of the saline solution used is important. For the process developed here a 35% $CaCL_2H_2O$ solution is being used (Calcium Chloride Dihydrate). The synthetic polyisoprene IR supplied by the manufacturer Kraton from Houston, Tex., USA is generally readily storable. Unlike the known natural latex process, in the described manufacturing process the latex mixture is prepared with a water-soluble vulcanizing agent, for example blended with Bostex from Akron Dispersions of Akron, Ohio, USA and, for example, with Manawet, a surface-activating compound from Synalloy of Cleveland, Tenn., USA, and the mixture is allowed to ripen at a specific temperature for a specific time. The sequence of adding the additives is important. From the moment of this addition, especially from the addition of the vulcanizing agent, the storage stability is shortened, and the raw material emulsion should be used up in a few days. Here is an example of a recipe used: (IR: 100 phr, surface agent 0.40 phr, vulcanizing agent 4.0) Maturation temperature <45° C. over a period of 12 hours, rapid cooling and subsequent homogenization over a period of >12 hours.

First, the molds are wetted in a coating process with coagulants (coagulants). The whole manufacturing process depends on the correct surface structure of the molds. Some roughness, such as sandpaper for sanding, has been found to be beneficial, although the process also works with smooth surface shapes, such as with an aluminum body. Further, the temperature of the molds is important. At a temperature of 25° to 30°, or depending on the surface structure of the molds, up to 60°, the coagulation takes place safely and quickly. This temperature is necessary when the mold is immersed into a mixture of synthetic polyisoprene IR with a coagulant agent. The duration and sequence, the movement of the immersion into and emmersion out of the coagulation solution is carried out by immersing the porcelain arms into a vertical position for a few seconds in the solution, then pulled out and then immediately immersed into the polyisoprene tank. Unlike the conventional process, the coagulant agent on the mold is not dried, but is immersed in the wet state directly into the synthetic polyisoprene.

In this immersion, the mold is immersed in the synthetic polyisoprene at a controlled rate and left submerged for some time. Thereafter, the mold is pulled out again at a controlled speed, then rotated through 180° so that the hands of the hand molds are on top and are brought upright to the next process. This process depends on:
on the sequence
on the speed and nature of the immersion movement
on the immersion and emmersion
on the movement of the forms during the process For the practical implementation of the method, the device shown in FIG. 2 is used for the production of protective gloves. FIG. 3 shows the swivel table 3 of this device equipped with four glove molds 4, ready for immersion in a polyisoprene immersion bath. The type, i.e. in particular the protection class of the gloves produced, depends on the mold coating with coagulum solution and the residence time of the molding in the synthetic polyisoprene solution. The longer the mold lingers in the emulsion, the thicker the latex layer becomes on the shaped body. While the molded body is immersed, gel formation occurs. This gel is made by solidifying the synthetic polyisoprene on the mold, thereby expelling liquid. Salts and saline water come to the surface, which can be called sweating. The process depends on the time, the temperature and humidity of the environment during the gelation and the sweating process.

In FIG. 4, the pivoting table 3 is shown in a position pivoted by 45° with a single glove-shaped body 4. On this body 4, while in the bath, a synthetic polyisoprene layer has been created. In order to secure a uniform layer on the shaped body 4, the body is pulled out of the bath and pivoted or rotated immediately, or swung out directly from the bath. The layer, which is still soft, still has a flowing tendency due to gravity. By pivoting, the flow direction is turned around on the molding 4 and at the same time the layer coagulates and the flow tendency stops. After emersion of the now coated mold 4 and gelling in a further phase, the ejected salt is removed from the surface of the synthetic polyisoprene and osmotic processes help leaching. This process depends on the time of immersion in the lye and the temperature of the leach.

Next, vulcanization follows. For this purpose, the molds 4 are heated with their coatings of coagulated synthetic polyisoprene in an oven at about 120° C. The plastic properties of the synthetic polyisoprene are lost and the product gets its elastic property. The long chain molecules are crosslinked by the vulcanization chemicals mixed into the synthetic polyisoprene. The process depends on:
the time and temperature in the oven
the conditioning of the furnace
the temperature evolution during the process FIG. 5 shows the swivel table 3 with four protective gloves 11 on its molds 4 after the vulcanization of the synthetic polyisoprene.

After vulcanization of the layer on the mold 4, the molds are allowed to stand for a while and the products continue to mature. Then the gloves 11 (FIG. 5) can be pulled off the molds and brought to the next phase. These now raw gloves 11, pulled off the molds (FIG. 5), then go through a washing with water as next. This rinses off the salts and other chemical elements that have been eliminated during vulcanization and are located on the inside and outside surfaces of the gloves. The process depends on the temperature, the washing solution and the mechanical process of washing.

According to an alternative method of production, the products of synthetic polyisoprene (IR) or synthetic latex are made in that liquid synthetic polyisoprene is injected into an at least two-part hollow mold for the product to be produced. The injection mold, made of metal, similar to an injection mold for plastic products, contains a hollow mold for the outside of the product to be made, and a core held in the inside of this hollow mold for the inner surface of the product to be made by injection, be it a protective glove, a shoulder protector, a head protection, a boot, a protective jacket or pants. The distance between the hollow mold and the core determines the thickness of the product. To reliably fill all areas of the remaining space within the hollow mold with liquid synthetic polyisoprene, it can be injected at several locations simultaneously or in a chronological sequence, and discharge channels can also be provided for the air to be displaced. The mold is maintained at a temperature of 60° C. to 70° C., which is supports to coagulation of the synthetic polyisoprene. After removal from the mold, the product thus produced by injection-molding is treated further. In the following, this further treatment is being described using the example of protective gloves, but it is essentially identical for the other products. The clean, raw gloves 11 are now subjected to halogenation. This is used for surface treatment and smoothes the glove surface. The chemical structure is permanently and irreversibly changed and makes the glove smoother for wearing on the body skin and makes it pH neutral, which is generally important for the skin compatibility. The process depends on the temperature and time of immersion in the halogenation solution for the surface treatment.

After halogenation, the gloves are rinsed with water and dried. This process depends only on the temperature and the residence time in a drying installation. The glove stabilizes its structure over time, even after the production phases and it gains in quality. So there is a pronounced maturation process. It has even been shown that such electro-protective gloves, after several days of production, are even better in their protective quality, although this fact has not yet fully understood technically or molecular-chemically.

Regardless of this maturation process, gloves can be passed directly after drying the test personnel for quality inspection, because they are then already sufficiently protective and stable. Each glove is subjected to an individual, internationally standardized test, which is carried out exactly the same way in Europe, in the USA and also in Brazil. First, every electro-protective glove is visually inspected and then subjected to an electro-test in accordance with the standard regulations. In addition, according to the standards, a certain percentage of the production is passed on to further tests, which test further physical and mechanical properties, whereby also electrical limit tests are made, that is to say, at which voltage a breakdown takes place.

The first serially manufactured electro-protective gloves were tested in September 2015 in a laboratory accredited by the Brazilian quality assurance authority INMETRO. They passed all the tests according to the existing Brazilian standards. The tested gloves were of the class 00 and 0,—which cover the main needs of the market. Compared to traditional rubber or rubber gloves, the gloves have better quality and could even be produced thinner today than the standard requires and yet these gloves would still meet the test standards. In practice, the gloves are approved for use at far lower voltages and used, as can be seen in the table above. Only when all these tests have been passed, the gloves are being marked according to the standard and then allowed to be sold as certified gloves.

Further embodiments are disclosed in the following clauses:

1. Electrical insulation product for personal protection equipment (PPE), produced according to one of the preceding clauses, characterized in that the electrical insulation product is an electric protective glove (11) of a least 280 mm in length and reaching up to the brachial joint, made as a layer on a shaped body (4) of metal, plastic or porcelain, with smooth to rough, sandpaper-like surface in the form of a human forearm with hand, or made in an at least two part metal injection mold for a human forearm with hand, by injection into the injection mold, in layer thicknesses of 0.4 mm to 3.6 mm, for standard classes 0 to 4, that is for a breakdown safety at operating voltages of 500 V to 36,000 V and test voltages of 2,500 V to 40,000 V.

2. Electrical insulation product for personal protection equipment (PPE), produced according to one of preceding clauses, characterized in that the electrical insulation product is a shoulder protection reaching to the brachial joint, manufactured on a mold (4) made of metal, plastic or porcelain, with a smooth to rough, sandpaper-like surface in the form of a human arm without hand, but with shoulder area, or manufactured in an at least two-part metal injection mold for this human arm without hand, but with shoulder area, by injection into the mold, in layer thicknesses 0.4 mm to 3.6 mm, for standard classes 0 to 4, that is for a breakdown safety at operating voltages of 500 V to 36'000 V and test voltages from 2'500 V to 40'000 V.

3. Electrical insulation product for personal protection equipment (PPE), produced according to one of preceding clauses, characterized in that the electro-isolation product is a head protection of synthetic polyisoprene, wherein a shaped mold (4) in shape a human head is made of metal, plastic or porcelain with a smooth to rough, sandpaper-like surface is dipped head first into the immersion bath (1), so that at least the back of the head (4) to a line from the neck to the eyebrows of the mold (4) immersed and afterwards with a swing is emerged, or manufactured in an at least two-part injection mold from metal for an occiput up to a line from the neck up to the eyebrows, by injection into the injection mold, in layer thicknesses 0.4 mm to 3.6 mm for the head protection, for standard classes 0 to 4, that is for a breakdown safety at operating voltages of 500 V to 36'000 V and test voltages from 2'500 V to 40'000 V.

4. The personal protection equipment (PPE) electrical insulation product produced according to any one of preceding clauses, characterized in that the electro-insulation product is a synthetic polyisoprene boot in that a mold (4) of metal, plastic or porcelain with smooth to rough, sandpaper-like surface in the form of a human lower leg with foot is immersed into a dipping bath (1) so that at least the foot and lower leg of the mold (4) dips and afterwards with a swing is emerged, or manufactured in an at least two-part injection mold made of metal for the lower leg with foot, in layer thicknesses of 0.4 mm to 3.6 mm for the boot to be manufactured, for standard classes 0 to 4, that is for a breakdown safety at operating voltages of 500 V to 36,000 V and test voltages of 2,500 V to 40,000 V.

5. Electrical insulation product for personal protection equipment (PPE), produced according to one of preceding clauses, characterized in that the electrical insulation product is a protective jacket made of synthetic polyisoprene, by a mold (4) made of metal , plastic or porcelain with a smooth to rough, sandpaper-like surface in the form of a human upper body without head and hands is immersed into a dipping bath (1) and afterwards with a swing is emerged, or manufactured in an at least two-part injection mold made of metal for the shape of a human upper body without head and hands, in layer thicknesses of 0.4 mm to 3.6 mm for the protective jacket to be produced, for standard classes 0 to 4, that is for a breakdown safety at operating voltages of 500 V to 36,000 V and test voltages of 2,500 V to 40,000 V.

6. Electrical insulation product for personal protection equipment (PPE), produced according to one of claims preceding clauses, characterized in that the electrical insulation product are protective trousers made of synthetic polyisoprene, by a mold (4) made of metal, plastic or porcelain with a smooth to rough, sandpaper-like surface in the form of a human hip / loin with the two legs without feet which is immersed in the dipping bath (1), and afterwards is emerged with a swing, or is manufactured in a metal mold of at least two parts with the shape of the human hip / loin with the two legs without feet, in layer thicknesses of 0.4 mm to 3.6 mm for the protective trousers to be produced, for standard classes 0 to 4, that is for a breakdown safety at operating voltages of 500 V to 36,000 V and test voltages of 2,500 V to 40,000 V.

7. Use of an electrical insulation product for personal protection equipment (PPE) prepared according to one of preceding clauses, for the enclosure of building modules, battery components and devices of all kinds, which contain high voltage components.

8. Use of an electrical insulation product for the protection of persons and equipment, produced according to one of preceding clauses, for the enclosure of building modules, battery components and devices of all kinds, which contain high-voltage components or must be protected against high voltage influence.

The invention claimed is:

1. A process for the production of electrical insulation products for the personal protection equipment (Personal Protection Equipment PPE) in the high-voltage domain, that is for use in the area of electrical voltages of 500 V up to 36'000 V, in which polyisoprene is formed as a formed body in that synthetic polyisoprene (IR) or synthetic latex is used either by coagulation as layer on a mold (4) and then vulcanized, or injected with pressure into a hollow injection mold and vulcanized therein, and that the obtained demolded molded body (11) is made salt-free, pH-neutral and smooth in relation to body skin by washing, leaching and halogenation, in that a) either a shaped mold (4) in a dipping process previously treated with a coagulant solution is immersed into an emulsion of the synthetic polyisoprene (IR) when the shaped mold wetted with the coagulant solution is in a wet state, so that by coagulation on an outer surface of the shaped mold (4), a synthetic polyisoprene layer is formed, and then formed synthetic polyisoprene layer is vulcanized in an oven together with the shaped mold (4), or by means of an injection molding process a fluid synthetic polyisoprene is injected with pressure into the hollow injection mold in which vulcanization takes place and a synthetic polyisoprene layer is formed and vulcanized within the hollow injection mold, b) vulcanized synthetic polyisoprene layer as a synthetic polyisoprene molded body (11) is removed from the shaped mold (4) or is demolded by separating parts of the injection mold;

c) salts precipitated by vulcanization on the synthetic polyisoprene-molded body (11) are washed away with a water solution;

d) the synthetic polyisoprene molded body (11) is surface-treated by halogenating the synthetic polyisoprene molded body with a halogenating solution for neutralizing pH and increasing suppleness of the synthetic polyisoprene molded body with respect to body skin; and e) the synthetic polyisoprene molded body (11) is dried.

2. The process for the production of electrical insulation products for personal protection equipment (PPE) according to claim 1, characterized in that the fluid synthetic polyisoprene (IR) is injected with pressure into an at least two-part hollow mold, vulcanized in there, and after vulcanization the at least two-part hollow mold is being opened and the polyisoprene molded body (11) is demolded, then freed of salt in a bath, and then the resulting molded body is rendered salt-free, pH-neutral and obtained molded body (11) made smooth/supple with respect to body skin by washing, leaching and halogenation.

3. The process for the production of electrical insulation products for personal protection equipment (PPE) according to claim 1, characterized in that under step a) the shaped mold coated with the coagulant solution is directly immersed in the emulsion of the synthetic polyisoprene after pulling out from the coagulant solution.

4. The process for the production of electrical insulation products for personal protection equipment (PPE) according to claim 1, characterized in that a1) the shaped mold (4) made of porcelain, plastic or metal, having a smooth or rough, sandpaper-like surface, is treated with the coagulant solution, by immersing the shaped mold (4) for a few seconds in an aqueous salt solution as coagulant, a2) the shaped mold (4) is dipped out of the coagulant solution with a rotation, a3) the shaped mold (4), coated with the coagulant solution, is immersed in the emulsion of the synthetic polyisoprene (IR) or synthetic latex for a period of several seconds to minutes, whereby on the shaped mold (4) a gel-like synthetic polyisoprene layer forms, b) the shaped mold (4) is emerged with the synthetic polyisoprene layer by a 180° pivoting, the synthetic polyisoprene layer is left on the shaped mold (4), coagulum salts and water emerge on the surface and the shaped mold (4) and the polyisoprene layer is washed with water in a water bath and leached, thereby freeing the salts, c) thereafter, the synthetic polyisoprene layer is vulcanized together with the shaped mold (4) in an oven, wherein the long-chain molecules are crosslinked in the synthetic polyisoprene by vulcanizing chemicals, stimulated by the temperature, so that an initially plastic synthetic polyisoprene is converted into an elastic state and is left on the mold (4) for a period of time for ripening, d) the synthetic polyisoprene layer is removed as the synthetic polyisoprene molded body (11) from the shaped mold (4), e) the salts precipitated by the vulcanization are removed from the polyisoprene molded body by means of a washing process in water, thereafter f) the synthetic polyisoprene molded body (11) is halogenated in a halogenating solution for a period of time to smooth the surface of the polyisoprene molded body (11) and irreversibly alter chemical structure thereof and thereby achieving a skin-compatible pH neutrality, and g) the synthetic polyisoprene molded body (11) is rinsed again and then dried and physical, chemical and electrical properties thereof are tested.

5. The process for the production of electrical insulation products for personal protection equipment (PPE) according to claim 1, characterized in that the shaped mold (4) is immersed for several seconds in the coagulant solution and then for several seconds to minutes in an emulsion of synthetic polyisoprene (IR) or synthetic latex that is added with a vulcanization agent, so that by coagulation on the dipped mold (4) a gel-like synthetic polyisoprene layer is formed, b) the shaped mold (4) is emerged with the synthetic polyisoprene layer by a 180° pivoting, the synthetic polyisoprene layer is left on the shaped body (4), coagulum salts and water on the surface of the polyisoprene layer of the molded body are washed in a water bath with water and leached and thus the polyisoprene layer is freed from the salts, c) thereafter, the synthetic polyisoprene layer is vulcanized together with the shaped mold (4) in an oven, wherein the long-chain molecules are crosslinked in the synthetic polyisoprene by the vulcanization agent and stimulated by the temperature, so that an initially plastic synthetic polyisoprene is converted into an elastic state and is left on the mold (4) for a period of time for ripening, d) the synthetic polyisoprene layer is removed from the shaped body (4), e) the salts precipitated by the vulcanization are washed off by washing in a water bath on the inside and outside of the resulting synthetic polyisoprene molded body (11), f) the synthetic polyisoprene molded body (11) is halogenated for a period of time in a tempered halogenating solution, for smoothing the surface of the polyisoprene molded body (11) and irreversibly altering chemical structure thereof and thereby achieving skin-compatible pH neutrality, and g) the synthetic polyisoprene molded body (11) is rinsed and then dried and physical, mechanical and electrical properties thereof are tested.

6. The process for the production of electrical insulation products for personal protection equipment (PPE) according to claim 1, wherein the shaped mold is made of porcelain, metal, or plastic.

7. The process for the production of electrical insulation products for personal protection equipment (PPE) according to claim 1, wherein the shaped mold has a rough or a smooth surface.

8. The process for the production of electrical insulation products for personal protection equipment (PPE) according to claim 1, wherein the synthetic polyisoprene molded body formed has a thickness from 0.4 mm to 3.6 mm suitable for electrical insulation for operating voltages of 500 V to 36,000 V or test voltages of 2,500 V to 40,000 V.

9. A process for production of electrical insulation products for personal protection equipment (PPE) for high-voltage domain in a range of electrical voltages of 500 V up to 36,000 V, the process comprising:

a) immersing a shaped mold in a coagulant solution;

b) immersing the shaped mold, when the shaped mold coated with the coagulant solution is in a wet state, in an emulsion of synthetic polyisoprene (IR) containing a vulcanization agent so that a synthetic polyisoprene layer is formed on the shaped mold by coagulation;

c) vulcanizing the synthetic polyisoprene layer together with the shaped mold in an oven;

d) removing vulcanized synthetic polyisoprene layer from the shaped mold thereby obtaining a synthetic polyisoprene molded body; and e) surface-treating the synthetic polyisoprene molded body with a halogenating solution, thereby neutralizing pH and increasing suppleness of the synthetic polyisoprene molded body with respect to body skin.

10. The process for production of electrical insulation products for personal protection equipment according to claim 9, further comprising rinsing and drying surface-treated synthetic polyisoprene molded body after e).

11. The process for production of electrical insulation products for personal protection equipment according to claim 9, further comprising removing salts precipitated by vulcanization on the synthetic polyisoprene molded body by washing with a water solution before said surface-treating in e).

12. The process for production of electrical insulation products for personal protection equipment according to claim 9, further comprising removing salts on the synthetic polyisoprene layer formed on the shaped molded body by washing and leaching with water in a water bath before said vulcanizing in c).

13. The process for production of electrical insulation products for personal protection equipment according to claim 9, wherein the coagulant solution and the emulsion of synthetic polyisoprene are contained in two dipping baths situated next to each other.

14. The process for production of electrical insulation products for personal protection equipment according to claim 9, wherein the shaped mold coated with the coagulant solution is directly immersed in the emulsion of the synthetic polyisoprene after pulling out from the coagulant solution.

15. The process for the production of electrical insulation products for personal protection equipment according to claim 9, wherein after pulling out from the emulsion of the synthetic polyisoprene, the shaped mold having a gel-like layer of the synthetic polyisoprene thereon is immediately pivoted or rotated, or swung out from a dipping bath containing the emulsion of the synthetic polyisoprene to obtain an uniform synthetic polyisoprene layer on the shaped mold.

16. The process for the production of electrical insulation products for personal protection equipment according to claim 9, wherein after pulling out from the emulsion of the synthetic polyisoprene, the shaped mold having a gel-like layer of the synthetic polyisoprene thereon is immediately pivoted by 180° to obtain an uniform synthetic polyisoprene layer on the shaped mold.

17. The process for the production of electrical insulation products for personal protection equipment according to claim 9, wherein the shaped mold is pulled out from the coagulant solution with a rotation.

18. The process for the production of electrical insulation products for personal protection equipment according to claim 9, wherein the shaped mold is made of porcelain, metal, or plastic and has a rough or a smooth surface.

19. The process for the production of electrical insulation products for personal protection equipment according to claim 9, wherein the synthetic polyisoprene molded body formed has a thickness from 0.4 mm to 3.6 mm suitable for electrical insulation for operating voltages of 500 V to 36,000 V or test voltages of 2,500 V to 40,000 V.

20. A process for production of electrical insulation products for personal protection equipment (PPE) for high-voltage domain in a range of electrical voltages of 500 V up to 36,000 V, the process comprising:

a) immersing a heated shaped mold in an emulsion of synthetic polyisoprene (IR) containing a coagulating agent and a vulcanizing agent, wherein the heated shaped mold has a temperature of 60° C. to 70° C., so that by heat coagulation on the shaped mold a synthetic polyisoprene layer is formed;

b) vulcanizing the synthetic polyisoprene layer together with the shaped mold in an oven;

c) removing the synthetic polyisoprene layer from the shaped mold thereby obtaining a synthetic polyisoprene molded body; and d) surface-treating the synthetic polyisoprene molded body with a halogenating solution, thereby neutralizing pH and increasing suppleness of the synthetic polyisoprene molded body with respect to body skin.

* * * * *